July 5, 1960     N. BEL GEDDES     2,943,579
TRANSIT GRID

Filed April 2, 1957     5 Sheets-Sheet 1

INVENTOR.
NORMAN BEL GEDDES
BY Davis Hoxie & Faithfull
ATTORNEYS.

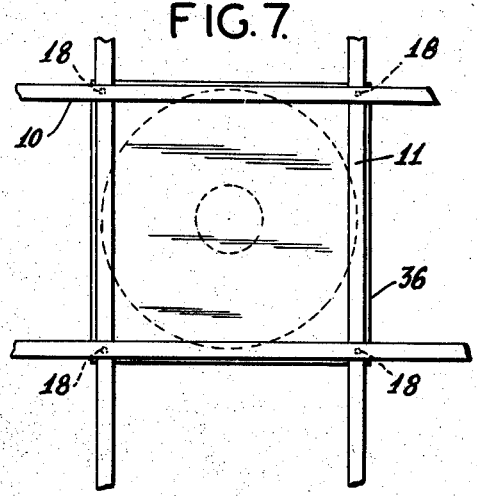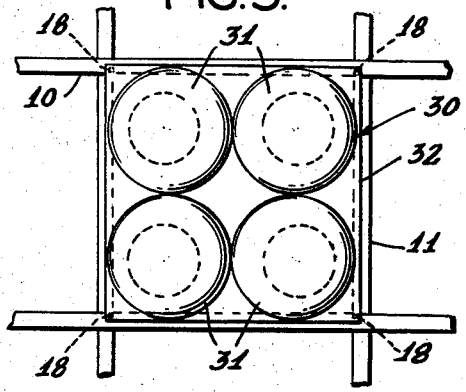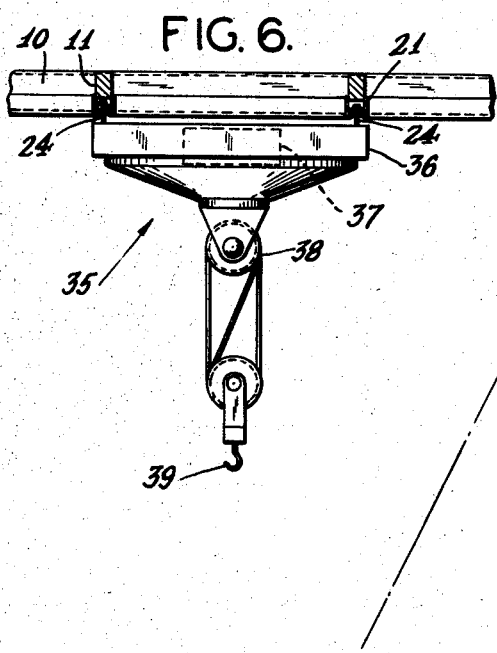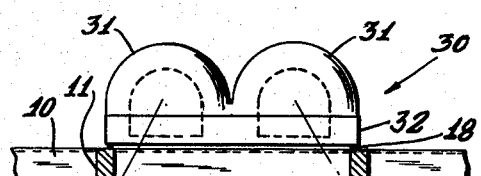

July 5, 1960  N. BEL GEDDES  2,943,579
TRANSIT GRID
Filed April 2, 1957  5 Sheets-Sheet 3
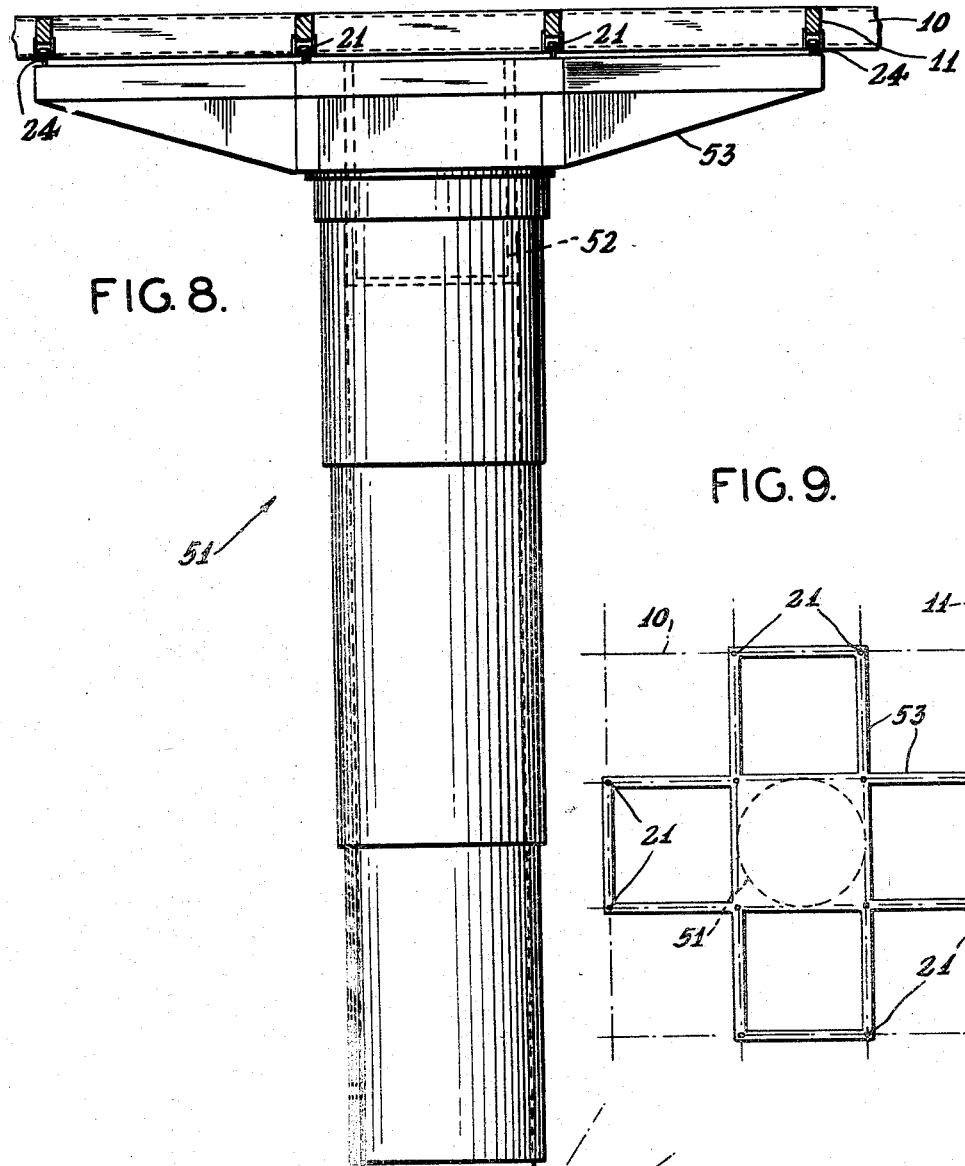
FIG. 8.
FIG. 9.
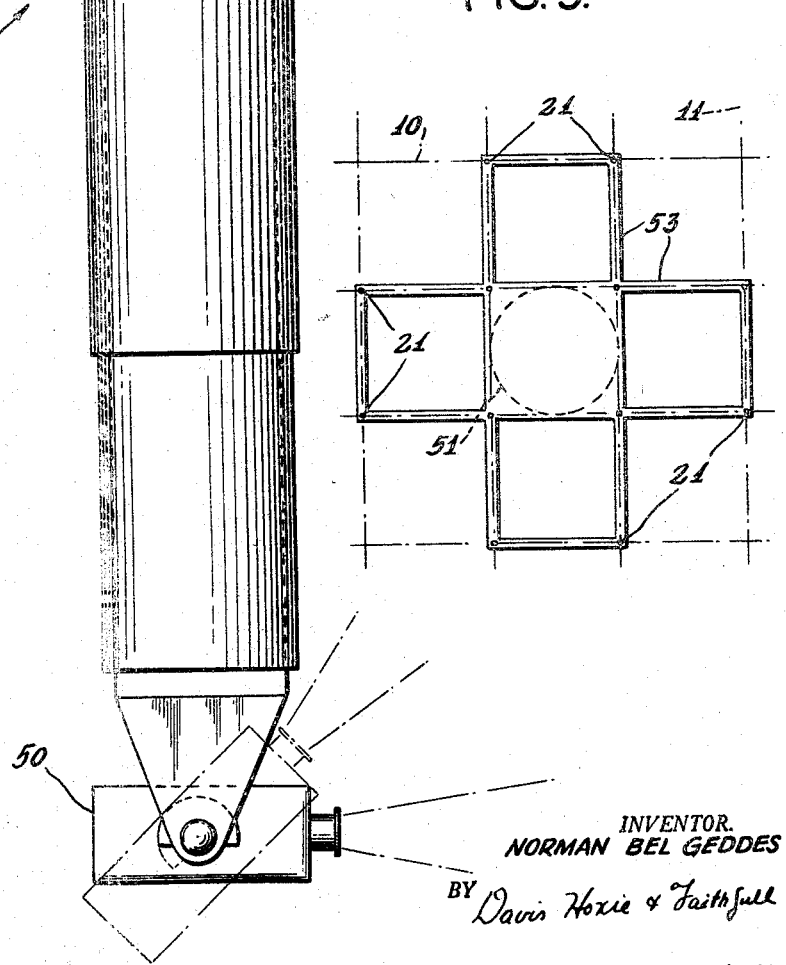
INVENTOR.
NORMAN BEL GEDDES
BY Davis Hoxie & Faithfull
ATTORNEYS.

July 5, 1960 N. BEL GEDDES 2,943,579
TRANSIT GRID

Filed April 2, 1957 5 Sheets-Sheet 4

INVENTOR.
NORMAN BEL GEDDES
BY Davis Hoxie + Faithfull
ATTORNEYS.

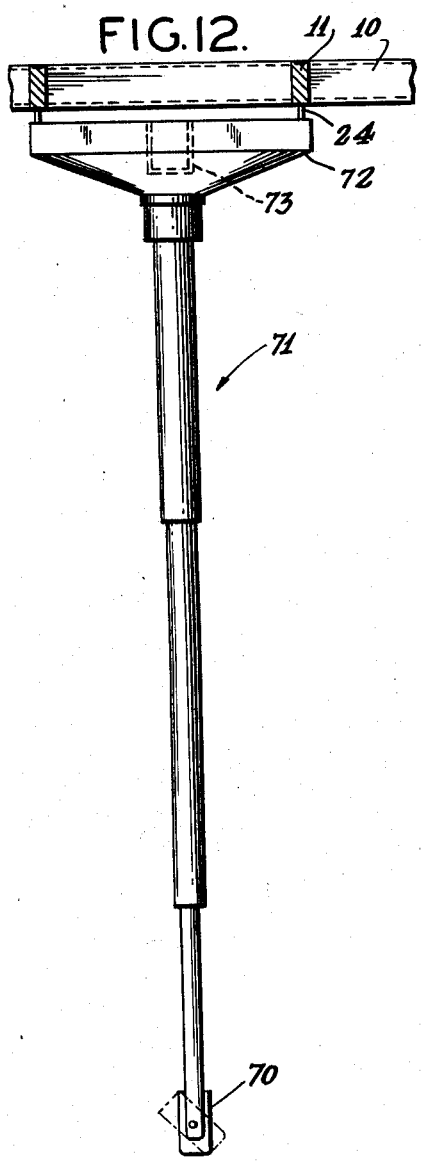
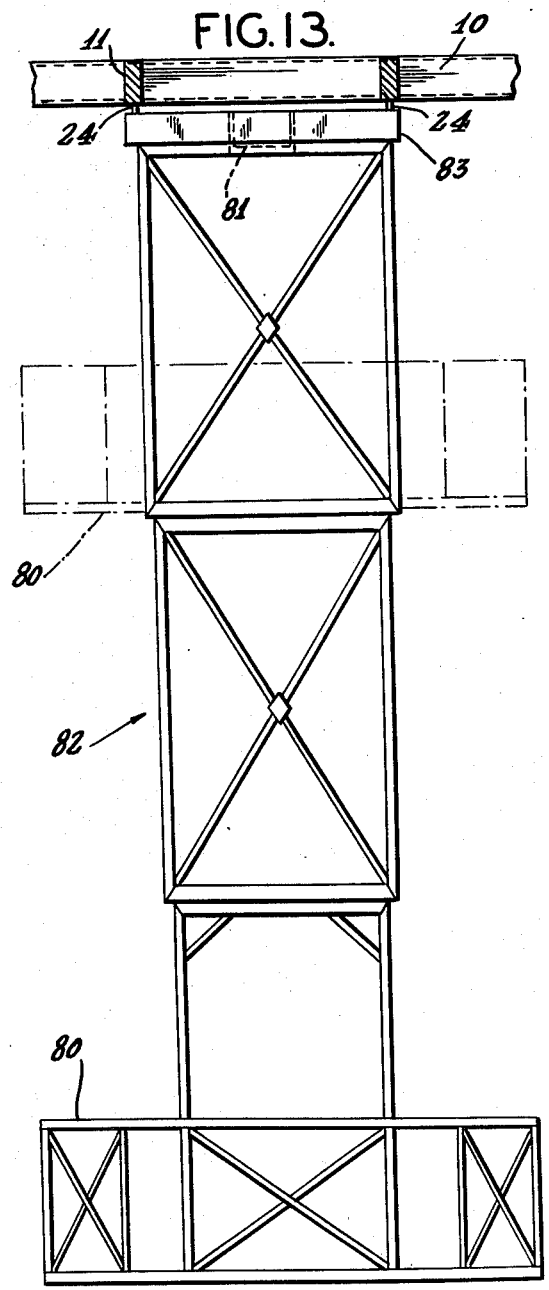

United States Patent Office 2,943,579
Patented July 5, 1960

2,943,579
TRANSIT GRID

Norman Bel Geddes, New York, N.Y.; Edith Bel Geddes, 350 Park Ave., New York 22, N.Y., executrix of said Norman Bel Geddes, deceased Filed Apr. 2, 1957, Ser. No. 650,187

5 Claims. (Cl. 104—94)

This invention relates to improved means for handling mechanical apparatus especially used in theatrical productions, permanent or portable stage and studio productions or the like.

Its purpose and effect is to provide flexible, simple and uncluttered means for supporting and positioning the mechanical apparatus required in such productions (such as lighting equipment, cameras, sound equipment, scenery, properties and people for repairs or other purposes) in a manner which will keep the stage floor clear of such equipment and of the accessories required to operate it. The invention lends itself, furthermore, to the provision of an accurate method of locating and precisely recording, in simple terms of three dimensions, the position which each unit of the equipment occupies or is to occupy.

The nature and substance or principle of the invention is the provision of a transit grid from the underside of which elements of the equipment may be suspended and moved in any of three dimensions to the positions they are intended to occupy, and on the upper side of which other equipment elements are movably supported for movement in two horizontal dimensions above the grid and for vertical movement to project them, if desired, through the grid.

The attached drawings illustrate and the following text describes an illustrative embodiment of the invention specifically developed for a television studio, and may be taken as setting forth, in accordance with the statutory requirement, the best mode now contemplated of carrying out the invention.

In the drawings:

Figures 4, 5, 10 and 11 illustrate upper track units; and

Figures 6, 7, 8, 9, 12 and 13 illustrate lower track units.

Figure 1 is a schematic plan view of a portion of the transit grid;

Figure 2 is an enlarged detailed plan view of one intersection of the beams;

Figure 3 is a sectional view of the beam taken at 3—3 of Figure 2;

Figure 4 is a side elevation of an upper level lamp unit;

Figure 5 is a plan view of Figure 4;

Figure 6 is a side elevation of a lower level hoist unit;

Figure 7 is a plan view of Figure 6;

Figure 8 is a side elevation of a lower level camera unit;

Figure 9 is a plan view of Figure 8;

Figure 10 is a side elevation of an upper level spot light unit;

Figure 11 is a plan view of Figure 10;

Figure 12 is a side elevation of a lower level microphone unit; and

Figure 13 is a side elevation of a personnel platform.

Figure 1:
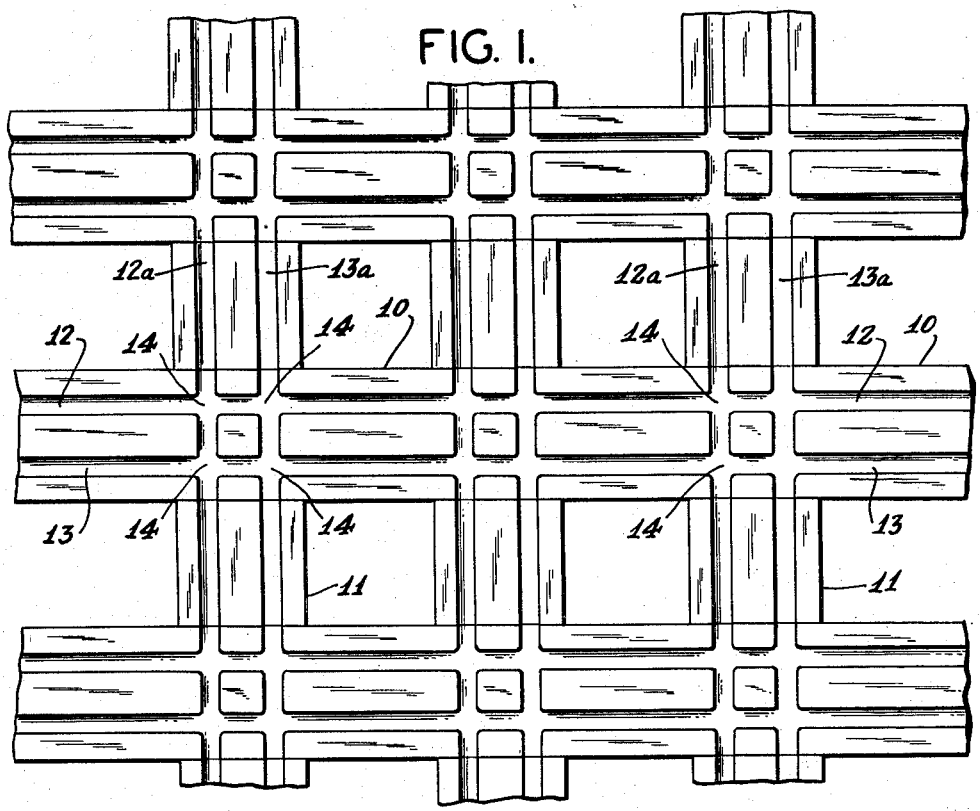
Figures 1, 2 and 3 illustrate the double track transit grid.

The transit grid is shown generally in a fragmentary plan view in Figure 1 as an array of intersecting beams 10 and 11 disposed at right angles to one another in a plane parallel to the floor of a studio between the floor and the ceiling, and defining a grid of rectangular openings of convenient dimensions. The ends of the beams are supported in a rigid position by any of the known techniques known to the art, for example, by the use of columns supporting the rails above the floor or hanging members suspending the rails from the ceiling. Each rectangular opening defined by the beams 10 and 11 in the preferred embodiment measures four feet along each side. Each beam has on its upper surface a pair of parallel recessed tracks or grooves 12, 13 and 12a, 13a indicated in Figure 1 and understood to extend the full length of the beams, into which a ball or disc wheel may be guided. At the intersections of the beams, one of which is shown in detail in Figure 2, the grooves are made to merge into and cross each other so as to establish intersections or switching points 14 through which the ball or disc wheel may pass in a straight path or be switched 90° into a groove on an intersecting beam.

Figure 3:
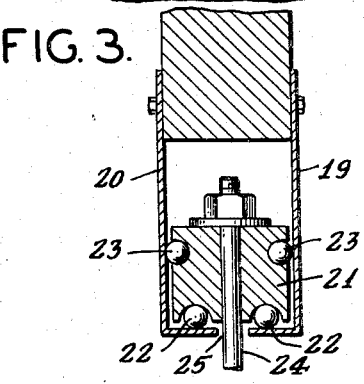
Figure 2:
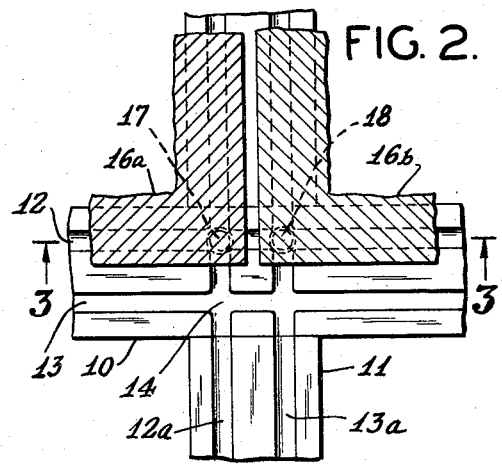

A sectional view of a representative beam is shown in Figure 3 taken along 3—3 of Figure 2, in which the grooves 12a and 13a are shown guiding and supporting two carriage support means such as a ball 17 and 18. Each ball 17 or 18 provides a support point for the carriage on the upper grid array.

Connected to the lower portion of beam 11 is a pair of angle beams 19 and 20 to form a housing and track assembly for guiding a movable carriage suspension trolley 21 to depend apparatus from beneath the grid array, the angle beams being spaced apart to afford an opening 25 between them. The trolley 21 is provided with two pairs of ball bearing rollers 22 and 23 guided on the horizontal and vertical legs of angle irons 19 and 20 respectively. The opening 25 provides a slot through which a support rod 24 may freely pass. At intersection points the slot or opening 25 branches into the intersected beams continuously so that a rod passing through the slot may be moved to any slot position beneath the grid array.

A typical piece of apparatus which has usefulness in being moved from location to location on the upper surface of the grid array is a multiple lamp instrument 30 shown in Figures 4 and 5. The carriage 32 comprises a four membered structure appropriately designed to house or support the desired studio apparatus above the grid on the balls 18. The carriage 32 appropriately may include carriage support members 16a or 16b described generally in connection with Figures 2 and 3. The illustrated lamp instrument 30 comprises four lamp units 31 which may be moved across the grid to a desired location manually by an operator using a guide pole from a position on the floor or along a catwalk not shown; or by electric controls, direct or remote. The energized lamps will illuminate the area below with light passing through the opening between the beams upon the stage below.

The lower portion of the grid array may simultaneously be used with the upper portion to support and guide studio equipment and apparatus which may be used only beneath the grid, such as a hoist 35 shown in Figures 6 and 7, for supporting and moving scenery or for moving furniture and other heavy apparatus about the stage. The hoist 35 illustrated in these figures comprises a four point suspension carriage 36 suspended from four carriage trolleys 21 by four support rod members 24 described above. A drive motor mechanism 37 remotely operated with controls not shown actuates a pulley and cable 38 supporting apparatus attached to a hook 39.

Another type of stage and studio equipment which may be moved with speed and flexibility beneath the grid is a remote controlled camera 50 shown in side elevation in Figure 8. In Figure 9, which is a plan view of Figure 8, is shown a twelve point suspension carriage 53 in the form of a cross. The twelve suspension contacts are deemed necessary because of the weight of such devices. The camera carriage 53 is suspended from the carriage trolleys 21 by twelve vertical support rod members 24. The carriage suspends a telescoping housing 51 at the end of which is connected the camera 50. The camera 50 is movable to any desired height and attitude or orientation beneath the grid manually or by control mechanisms included generally in the motor operated drive mechanism 52 which may be remotely controlled. The camera 50 is to assume a desired azimuth and tilt to direct the camera to view a desired scene or object.

Figures 10, 11:
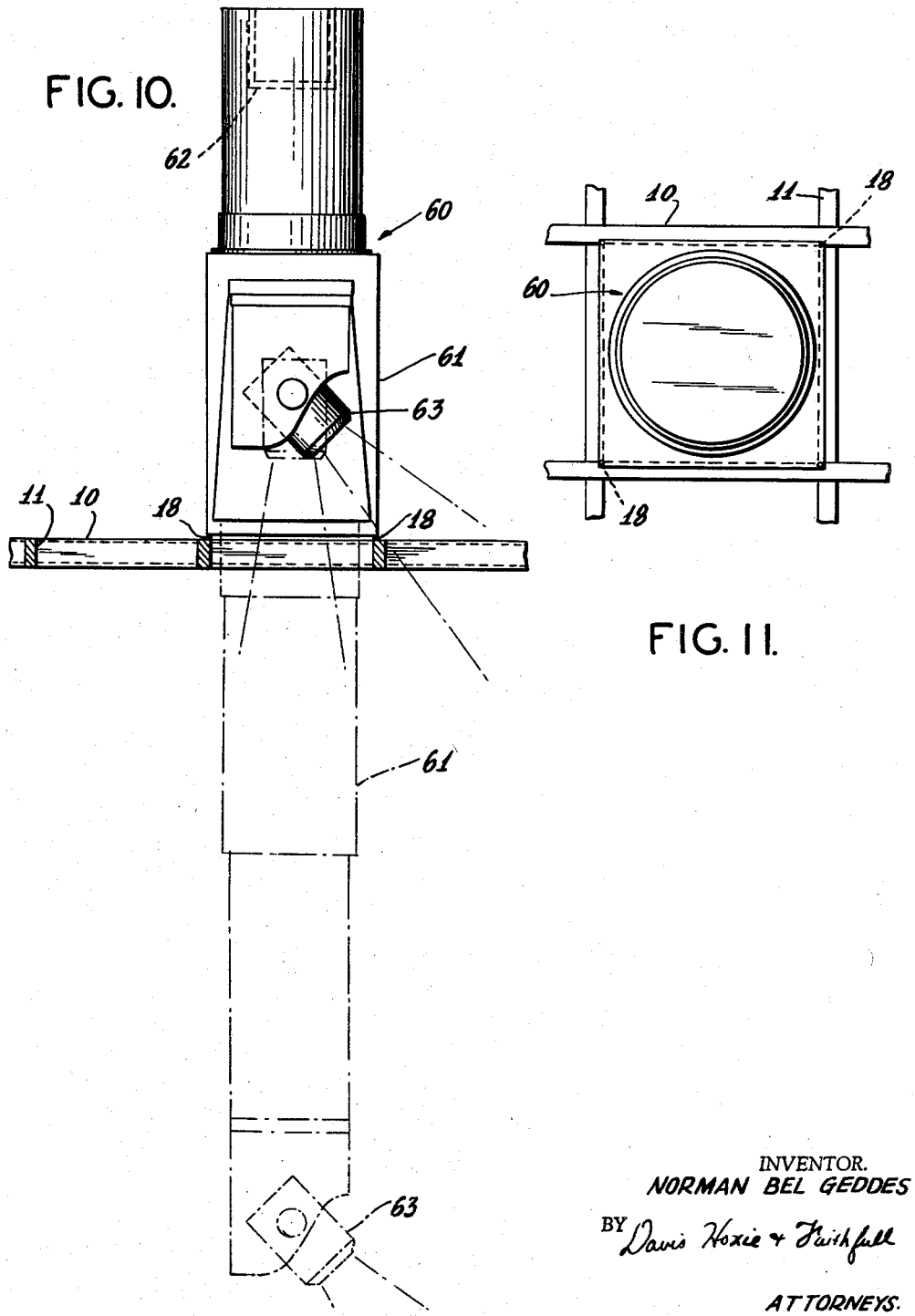

In Figures 10 and 11 is shown a spot light instrument 60 supported above the grid on four support balls 18 in the manner herebefore described. The instrument is mounted on a carriage and comprises a cylindrical telescoping housing 61 which in its contracted position is shown in the upper portion of Figure 10. Motor operated drive mechanism 62, remotely controlled, extends the housing 61 to a desired position (as indicated by the dotted lines) by projecting it down through the grid opening to a desired height above the stage floor. The spotlight 63 is remotely controlled to a desired azimuth and tilt position to project the light beam on a desired object. If desired, the housing 61 may be kept in a contracted position as is shown in the upper portion of Figure 10 and the spot light 63 may be tilted so as to project its beam through an adjacent grid opening onto an object beneath the grid. Such a telescoping scheme of using an upper grid supported instrument may be adapted to the use of a camera instead of a spot light.

In Figure 12 there is shown in side elevation a microphone instrument 70 suspended beneath the grid by four support rods 24. The carriage 72 includes the motor operated drive mechanism 73 for lowering or raising the telescoping suspension member 71 and a control mechanism for adjusting the azimuth and tilt of the microphone 70, if desired.

As a final illustration of the type of equipment which may be useful in the practice of the invention, there is shown in side elevation in Figure 13 a personnel platform 80 movably supported from a carriage 83 suspended from the lower track of the grid by four support rods 24. The framework 82 is designed to be telescoped beneath the grid to position the platform on or above the studio floor by motor operated drive mechanism 81. The dotted lines in the upper portion of Figure 13 indicate the extreme contracted position of the platform. Such a personnel platform instrument may advantageously be used by directors of the performance.

In operation, the transit grid may be used to move equipment of various types from equipment storerooms located near the staging area proper but which include an extension of the grid so that at all times the equipment even in storage is connected to the grid array and may be easily moved onto the staging area with the speed, simplicity and flexibility so essential to present day staging requirements. Although no mechanism or structure has been described for automatically moving these equipments upon the grid, it is evident that with present day skills self-propelling motor means remotely controlled may be applied to the instruments illustrated to provide a studio which is truly an example of automation on the stage.

The invention lends itself to a numbering scheme for precisely but simply locating in terms of spatial dimensions a desired position for each piece of equipment. For example, each grid opening may be assigned a single Arabic numeral thereby defining a horizontal two-dimensional grid location. A letter of the alphabet may be selected to establish the distance above or below the grid. Accordingly, if it is desired to position, for example, a camera such as described in Figures 8 and 9 on the staging area for a certain time interval of the presentation, a notation such as "12C16" would be interpreted by the stage manager as meaning that camera 50 is to be moved to grid opening 12 and is to be lowered to a height C beneath the grid and focused on area 16. Thus, in a very simple manner a precise plan may be devised before the presentation of the play or like with complete assurance that the equipment will be in the location planned for.

Accordingly, in the use and practice of the invention there is provided a highly flexible, efficient, simple yet accurate means for moving and positioning studio equipment before, during and after the period of stage and studio presentation.

I claim:

1. Means for handling equipment of the character described having, in combination: two groups of equally spaced parallel rails, the rails of one group intersecting the rails of the other group at a plurality of switching points and forming a plurality of openings between adjacent rails, the rails being supported in a plane intermediate the floor and ceiling of the studio, the rails including upper tracks for guiding and supporting a carriage, a carriage movably supported above the plane of the tracks and rails by movable means in the tracks, a studio instrument supported by the carriage, means included in the carriage for lowering and raising the instrument through one of said openings when said carriage is in a fixed position over said opening, the carriage being movable to any such opening and transferable from one rail track to another through a switch point formed at the intersection of the tracks.

2. Means according to claim 1, wherein the track includes a pair of spaced parallel grooves formed in the upper horizontal surface of its rails extending parallel to its longitudinal axis, the grooves of each intersecting rail being formed into an intersection with a corresponding groove of its associated intersecting rail, and a ball bearing included in the movable means of the carriage supported and guided in one of the track grooves, whereby two carriages may be guided and supported simultaneously side by side on said rails, at least one of said movable means of each of said carriages being on the same rail.

3. Means according to claim 1, wherein each of the rails includes lower tracks for suspending a second carriage, a second carriage movably suspended from the lower tracks, a second studio instrument suspended from the second carriage, means included in the second carriage for lowering and raising the second instrument to position it for use, the second carriage being movable to a selected location beneath the rails and being transferable from one lower rail track to another through a switch point at the intersection of the lower tracks.

4. Means according to claim 3, wherein the lower tracks comprise a pair of L-shaped beams connected to the lower portion of each of the rails forming a housing in which a carriage trolley may move, the L-shaped beams being spaced to provide a continuous opening parallel to the axis of its associated rail, a movable carriage trolley within the housing of the L-shaped beams, the continuous opening crossing into corresponding continuous openings of the intersecting rails to form a plurality of switch points, a rod connected to the trolley and extending downwardly through the opening, and the second carriage being suspended by the rod.

5. In a studio for presenting stage plays and the like, a stage adapted to the use of a plurality of instruments, a plurality of mutually intersecting beams forming an evenly spaced grid network of square openings, each of the beams including upper and lower tracks, an upper container movably supported on and above the upper tracks, one of said instruments in the upper container, means for lowering and raising said one instrument through an opening in the grid network, a lower container movably suspended from the lower tracks, another of said instruments in the lower container and means for lowering and raising said another instrument to any point beneath the grid network, said beams being provided with switch means including said upper and lower tracks to switch respectively said upper and lower containers from one path of track to another.

References Cited in the file of this patent

UNITED STATES PATENTS

| | | |
|---|---|---|
| 1,287,759 | Russell | Dec. 17, 1918 |
| 1,310,854 | Bartime | July 22, 1919 |
| 1,443,382 | Rapier | Jan. 30, 1923 |
| 1,627,746 | Moore | May 10, 1927 |
| 1,803,172 | Clayton | Apr. 28, 1931 |
| 1,889,112 | Shoemaker | Nov. 29, 1932 |
| 2,184,860 | Barrett | Dec. 26, 1939 |
| 2,227,145 | Lex et al. | Dec. 31, 1940 |
| 2,469,575 | Ralston et al. | May 10, 1949 |
| 2,616,375 | Nampa | Nov. 4, 1952 |
| 2,714,355 | Benson | Aug. 2, 1955 |